United States Patent
Strauss

(10) Patent No.: US 7,419,615 B2
(45) Date of Patent: Sep. 2, 2008

(54) RENEWABLE SUPERHYDROPHOBIC COATING

(75) Inventor: Dennis R. Strauss, Ventura, CA (US)

(73) Assignee: The Boeing Company, Chicago, IL (US)

(*) Notice: Subject to any disclaimer, the term of this patent is extended or adjusted under 35 U.S.C. 154(b) by 387 days.

(21) Appl. No.: 11/160,600

(22) Filed: Jun. 30, 2005

(65) Prior Publication Data

US 2007/0003705 A1    Jan. 4, 2007

(51) Int. Cl.
B44C 1/22 (2006.01)
(52) U.S. Cl. .............. 216/83; 216/67; 216/83; 428/426; 427/180
(58) Field of Classification Search ............ 216/83; 428/426; 427/180
See application file for complete search history.

(56) References Cited

U.S. PATENT DOCUMENTS 4,680,173 A * 7/1987 Burger .................. 424/47
2006/0024508 A1* 2/2006 D'Urso et al. ............ 428/426
2006/0081394 A1* 4/2006 Li et al. .................. 174/110 R
2006/0263516 A1* 11/2006 Jones et al. ................ 427/180
2007/0009657 A1* 1/2007 Zhang et al. ............... 427/180

OTHER PUBLICATIONS

R. Benedix, LACER, No. 5, (2000), pp. 157-167.*
S. Pal, Journal of Physical Chemistry, vol. 109, vol. 109, pp. 6405-6415, (2005).*

* cited by examiner

Primary Examiner—Shamim Ahmed
Assistant Examiner—Maki Angadi
(74) Attorney, Agent, or Firm—Ostrager Chong Flaherty & Broitman P.C.

(57) ABSTRACT

A method of forming a superhydrophobic material (66) includes mixing a hydrophobic material (24) with soluble particles (26) to form a mixture (32). The mixture (32) is cured. A portion of the soluble particles (26) is etched away from the mixture (32) to form the superhydrophobic material (66). A superhydrophobic material forming system (10) includes a mixer (30) that mixes a hydrophobic binder (24) with soluble particles (26) to form the mixture (32). A curing station (16) cures the mixture (32). An applicator (69) applies a solvent (68) to the mixture (32) to etch away a portion of the soluble particles (26) from the mixture (32) to form the superhydrophobic material (66).

22 Claims, 4 Drawing Sheets

RENEWABLE SUPERHYDROPHOBIC COATING

TECHNICAL FIELD

The present invention is related generally to hydrophobic surfaces and more particularly, to the formation of superhydrophobic surfaces and coatings.

BACKGROUND OF THE INVENTION

The surfaces of many structures, such as many aircraft exterior and interior surfaces, are susceptible to the buildup of ice, water, and other contaminants that can interfere with the uses of such surfaces. For example, the buildup of ice, water, and/or other contaminants on aircraft wings, propellers, rotors, and other functional surfaces can interfere with or degrade the operating performance of the aircraft. When such buildups occur, much time and cost can be expended in the removal thereof. As another example, contaminants, such as dust, dirt, and food residue, can buildup on vehicle interior components and provide an unclean or non-sanitary environment within a passenger cabin.

To prevent or mitigate the stated buildup, hydrophobic surfaces, which tend to repel water, are utilized. The surface tension of the hydrophobic surface is directly related to its ability to repel water. As surface tension decreases water droplets have increased preference to cling to themselves as opposed to the surface. When the self-clinging preference becomes large enough such that the water droplets bead up into nearly perfect spheres, the surface is considered a superhydrophobic surface.

A superhydrophobic surface is formed by creating a microscopically rough surface containing sharp edges and air pockets in a material of poor wetability (that is, a material that is not easily wetable and sheds water well). On a superhydrophobic surface, a drop of water will form a nearly spherical bead that will roll when the surface is tilted slightly. Thus, superhydrophobic surfaces shed water and snow easily. Furthermore, superhydrophobic surfaces resist soiling by waterborne and other contaminants, and are easily cleaned and useful in directing flow in microfluidic devices.

Superhydrophobic surfaces can be formed through embossing, molding, or machining rough surfaces in a hydrophobic material. However, over time as the surfaces become worn away by abrasion, the smoothness of the surfaces increases, and consequently the water-shedding behavior thereof is reduced or nonexistent. When the water-shedding behavior is lost, the water undesirably tends to stick in place and/or be absorbed by the surface.

Thus, there exists a need for an improved technique of forming superhydrophobic surfaces that increases the water-shedding life span thereof and/or allows for the restoration of the superhydrophobic material properties of the surfaces.

SUMMARY OF THE INVENTION

One embodiment of the present invention provides a method of forming a superhydrophobic material. The method includes mixing a hydrophobic material with soluble particles to form a mixture. The mixture is cured. An exposed portion of the soluble particles is etched away from the mixture to form the superhydrophobic material.

Another embodiment of the present invention provides a superhydrophobic material forming system. The system includes a mixer that mixes a hydrophobic binder with soluble particles to form a mixture. A curing station cures the mixture. An applicator applies a solvent to the mixture to etch away a portion of the soluble particles from the mixture to form the superhydrophobic material.

The embodiments of the present invention provide several advantages. One such advantage is the provision of forming a superhydrophobic material that is renewable. The restoration of superhydrophobic qualities of a material increases the surface life of that material and associated component, reduces waste, reduces system maintenance and/or operating costs, and minimizes replacement costs.

Another advantage provided by an embodiment of the present invention, is the provision of restoring the superhydrophobic qualities of a material through the dissolving of surface particles of that material. This provides a simple, quick, inexpensive, and easy technique of renewing the desired performance characteristics of a component.

The present invention itself, together with further objects and attendant advantages, will be best understood by reference to the following detailed description, taken in conjunction with the accompanying drawing.

Other features, benefits and advantages of the present invention will become apparent from the following description of the invention, when viewed in accordance with the attached drawings and appended claims.

BRIEF DESCRIPTION OF THE DRAWINGS

For a more complete understanding of this invention, reference should now be made to embodiments illustrated in greater detail in the accompanying figures and described below by way of examples of the invention wherein.

DETAILED DESCRIPTION

Figure 1:
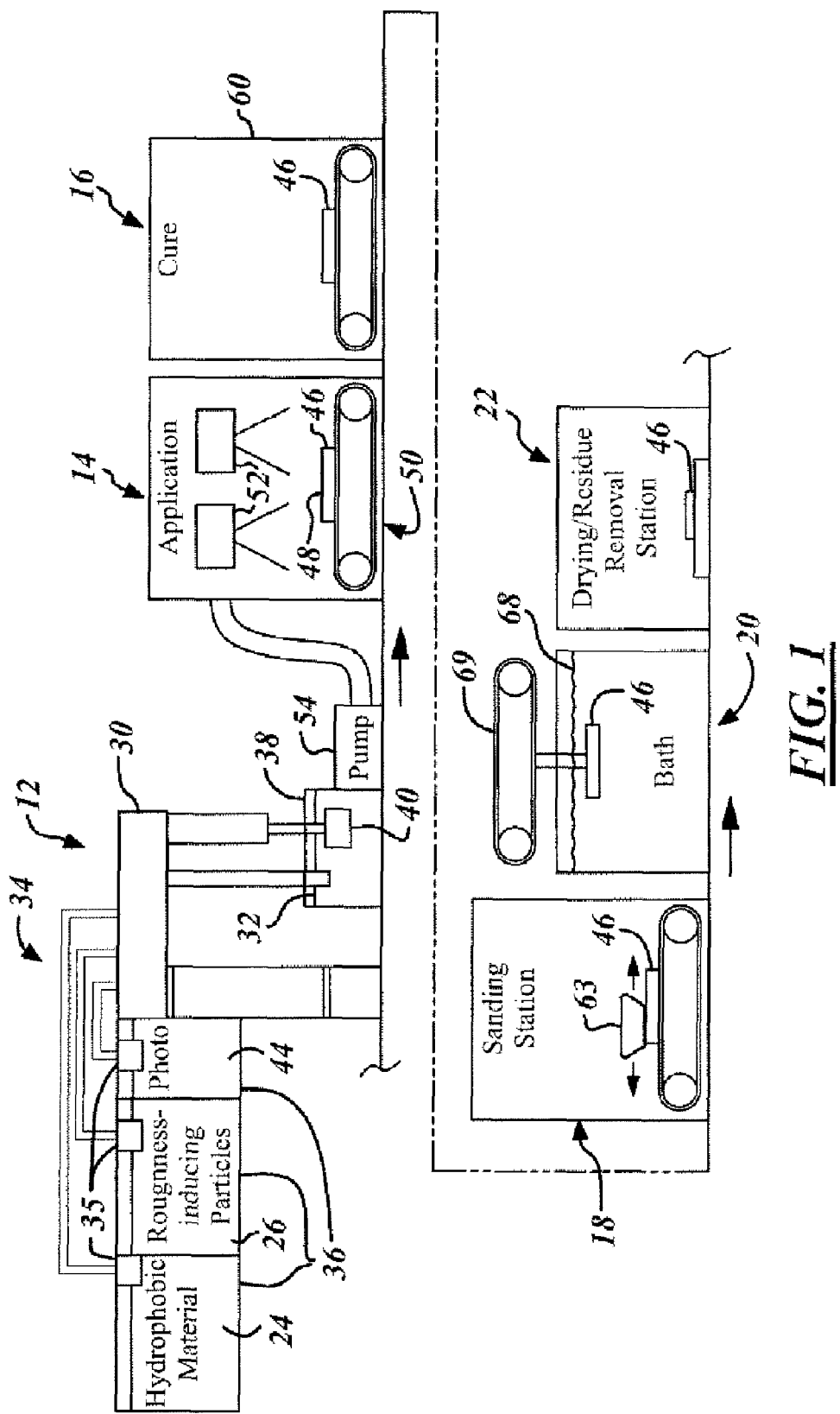
FIG. 1 is a perspective view of a superhydrophobic material forming system in accordance with an embodiment of the present invention.

In the following Figures the same reference numerals will be used to refer to the same components. While the present invention is described primarily with respect to the formation of superhydrophobic materials and surfaces, these materials and surfaces may be adapted and applied in various applications. The present invention may be applied in aeronautical applications, nautical applications, railway applications, automotive vehicle applications, medical applications, and commercial and residential applications. Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Also, in the following description the term "component" refers to an artifact that is one of the individual parts of which a composite entity is made up. A component may refer to a part that can be separated from or attached to a system, a part of a system or assembly, or other part known in the art.

In addition, the term "surface" refers to the outer boundary of an artifact or a material layer constituting or resembling such a boundary. A surface may include not only the outer edge of a material, but also an outermost portion or layer of a material. A surface may have a thickness and include various particles.

Furthermore, the term "hydrophobic surface" refers to a surface that has a water contact angle of approximately 90° or more. Typically, on a hydrophobic surface, for example, a 2 mm diameter water drop beads up but does not run off the surface when the surface is tilted moderately. As the surface is tilted, the wetting angle at the downhill side of the droplet increases, while the wetting angle at the uphill side of the droplet decreases. Since the advancing (downhill) interface has a hard time pushing forward onto the next increment of solid surface, and the receding (uphill) interface has a hard time letting go of its bit of solid surface, the droplet tends to remain stationary or pinned in place. A hydrophobic surface is described as having a large hysteresis between advancing and receding contact angles (typically 20 degrees or more).

Moreover, the term "Superhydrophobicity" or a "superhydrophobic surface" refers to a surface has a more restrictive type of hydrophobicity. On a superhydrophobic surface, the water contact angle is approximately 150 degrees or more, and a 2 mm diameter water drop tends to roll freely on a surface tilted a few degrees from level. On a tilted superhydrophobic surface, since the contact angle of the receding surface is high and since the interface tendency of the uphill side of the drop to stick to the solid surface is low, gravity overcomes the resistance of the drop to slide on the surface. A superhydrophobic surface is described as having a very low hysteresis between advancing and receding contact angles (typically 10 degrees or less). Note that larger drops will be more affected by gravity and will tend to slide easier, whereas smaller drops will tend to be more likely to remain stationary or in place.

Figure 2:
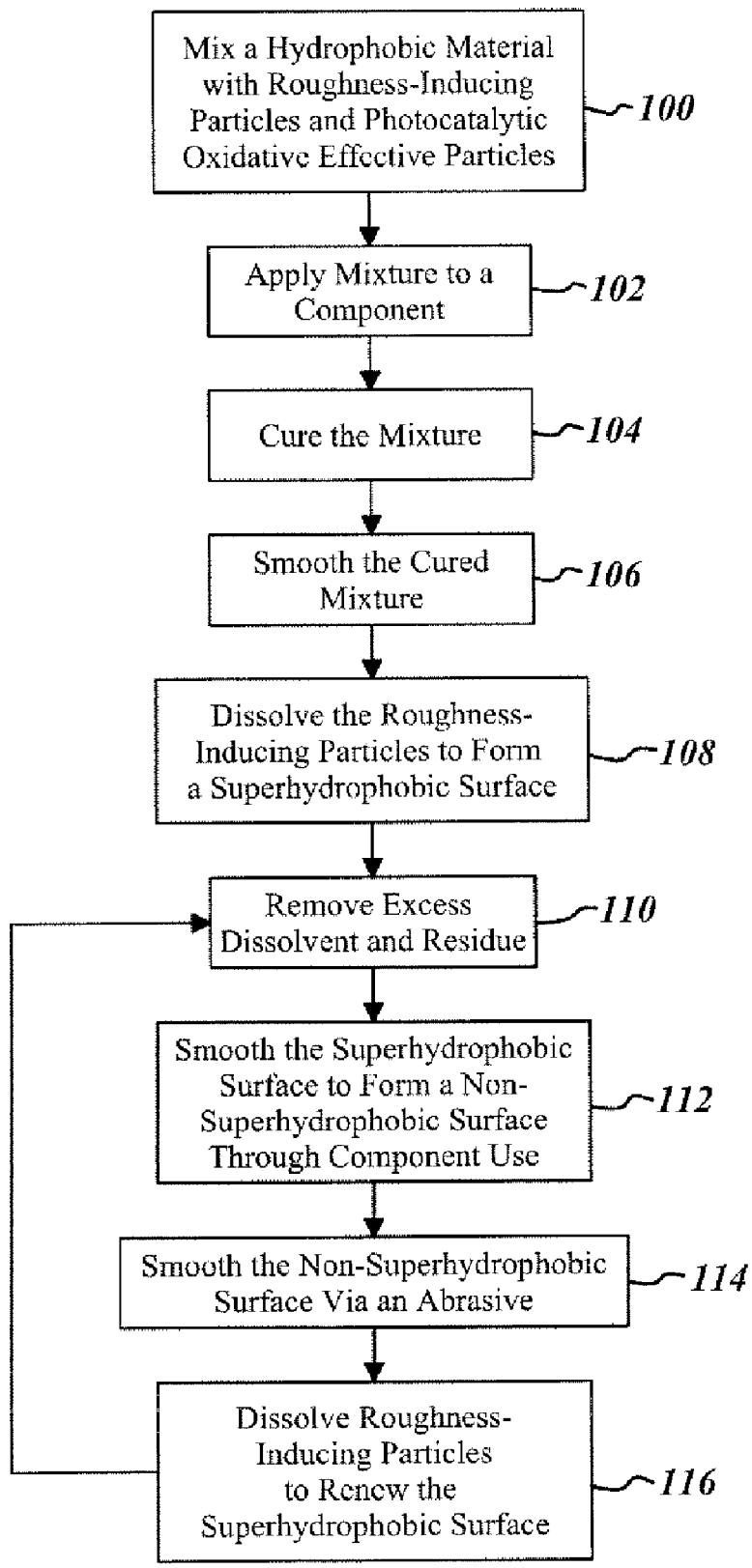
FIG. 2 is a logic flow diagram illustrating a method of forming a superhydrophobic material in accordance with an embodiment of the present invention.

Referring now to FIGS. 1 and 2, a perspective view of a superhydrophobic material forming system 10 and a logic flow diagram illustrating a method of forming a superhydrophobic material in accordance with an embodiment of the present invention is shown. The system 10 may include multiple stations as shown or may be incorporated into one or more stations having a multi-purpose operating system (not shown). The system 10 is provided as one example embodiment, each station of the system 10 may be modified depending upon the superhydrophobic material formed. The system 10 includes a mixing station 12, an application station 14, a curing station 16, a sanding or smoothing station 18, an etching station 20, and a finishing station 22.

Figure 3A:
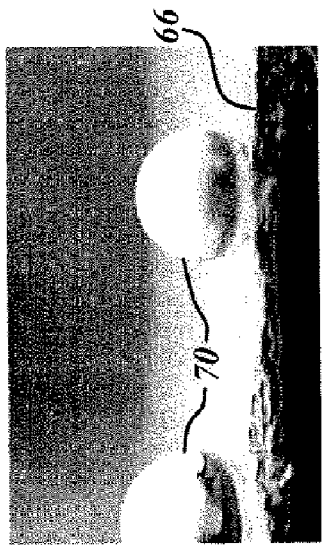
FIG. 3A is a pictorial view of a water drop on a hydrophobic material.
Figure 3B:
FIG. 3B is a pictorial and scanning electron microscopic view of the hydrophobic material of FIG. 3A.

In step 100, the mixing station 12 mixes a hydrophobic material 24 with roughness-inducing particles 26. In FIGS. 3A and 3B, a pictorial view of a water drop 28 on an applied layer of the hydrophobic material 24 and a pictorial and scanning electron microscopic view or photomicrograph of the hydrophobic material layer 25 are shown. The hydrophobic material layer 25 shown is in the form of paint and has a bumpy or rough texture. Water drops do not wet or soak into the hydrophobic material layer 25, but rather bead up into nearly spherical shaped droplets on the material layer 25.

The mixing station 12 includes a high shear mixer 30 or the like for the mixing of the hydrophobic material 24 and the roughness-inducing particles 26 to form a mixture 32. A "high shear mixer" refers to a mixer that reduces the size of the elements being mixed and may cause total dispersion and possibly emulsification of the elements. The high shear mixer 30 may be of various types and styles known in the art. The mixer 30 shown includes an element supply system 34 having pumps 35 for transferring elements from tanks 36 to a mixing bowl or tank 38. The elements are received in the mixing tank 38 and are mixed via a high shear bit 40.

In one embodiment of the present invention, the hydrophobic material 24 is in the form of and/or includes a binder. A "binder" refers to an element or compound that holds other elements or particles together. The hydrophobic material 24 may be or the mixture 32 may form a paint, a plastic, a polymer, a film, a self-supporting film, or other hydrophobic or semi-hydrophobic material known in the art. An example of a self-supporting film is polypropylene. A couple of examples of a hydrophobic material are polystyrene and a fluorocarbon film, such as polytetrafluoroethylene.

The roughness-inducing particles 26 are dispersible in the hydrophobic material 24 and remain in solid form. The roughness-inducing particles 26 may be, for example, Calcium Carbonate ($CaCO_3$), Sodium Chloride (NaCl), or other soluble solid-maintaining particle, which may be later dissolved subsequent to the curing of the mixture 32. The roughness-inducing particles 26 may be on the order of microparticles and are used to create voids 42 in the applied mixture or material layer 25 when dissolved. The voids 42 enhance the hydrophobic qualities of the material layer 25. The voids 42 are best seen in FIG. 5B.

The hydrophobic material 24 may also be mixed with photocatalytic particles 44. An example of a photocatalytic oxidative effective particle is titanium oxide ($TiO_2$). The photocatalytic particles 44 may be on the order of nanoparticles and are used to decompose environmental contaminants that can degrade the hydrophobicity of a material.

The above-stated materials and particles may be mixed for varying lengths of time and under various temperatures and pressures depending upon the materials and particles used and the superhydrophobic material being formed.

In step 102, the mixture 32 formed in step 100 may be applied to a component 46 or to a surface 48 of that component 46. The mixture 32 may be integrally formed as part of the component 46, molded over the component 46, be in the form of a film that is formed over the component 46, brushed onto the component 46, or applied using some other known application technique. The component 46 may be dipped or submerged into the mixture 32 to form a solid composite or mixture layer 49. In the example embodiment of FIG. 1, the component 46 is transported on a conveyor system 50 to the application station 14 and is coated with the mixture 32 via spray guns 52. The mixture 32 is transferred from the mixing tank 38 via a pump 54 to the guns 52. In one embodiment, the mixture 32 is in the form of a paint that is sprayed onto the component 46.

In step 104, the mixture layer 49 is cured to form a solid composite. The materials and particles of the mixture 32, as well as the material composition of the component 46 deem the curing parameters utilized. The curing parameters may include curing temperatures, curing times, pressures applied during the curing process, radiation, photo curing, and other curing parameters known in the art. Continuing from the above example embodiment, the mixture layer 49 is left to dry at room temperature. To assist in or decrease the cure time the component may be placed into an oven 60.

Figure 4A:
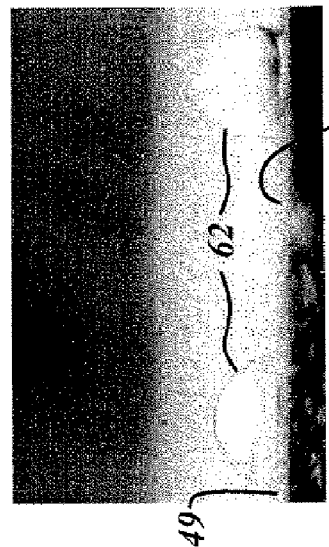
FIG. 4A is a pictorial view of water drops on the hydrophobic material modified to contain roughness-inducing particles and photocatalytic oxidative effective particles in accordance with an embodiment of the present invention.
Figure 4B:
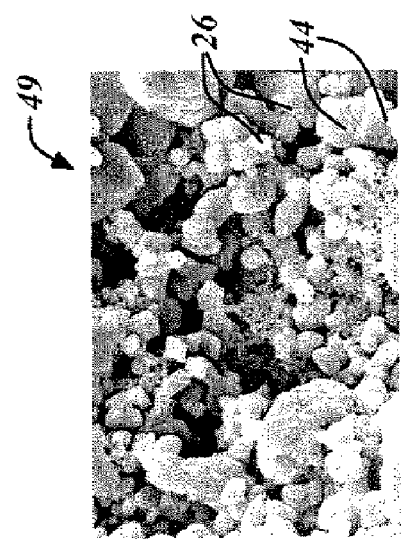
FIG. 4B is a pictorial and scanning electron microscopic view of the modified hydrophobic material of FIG. 4A.

In FIGS. 4A and 4B, a pictorial view of water drops 62 on the mixture layer 49, which contains the roughness-inducing particles 26 and the photocatalytic particles 44, as well as a pictorial and scanning electron microscopic view of the mixture layer 49 are shown. Water drops do not bead up as well on the mixture layer 49 as they do on the hydrophobic material layer 25 because the added particles 26 and 44 are not hydrophobic. Thus, the hydrophobicity of the mixture layer 49 is reduced in comparison with the hydrophobic material layer 25.

In step 106, upon curing of the mixture layer 49 or sometime thereafter one or more surfaces of the mixture layer 49 may be smoothed via an abrasive, such as sand paper or a sanding block. A sanding block 63 is shown. The component 46 is placed within the smoothing station 18. The smoothing is performed such that a sufficient amount of the roughness-inducing particles 26 within the mixture layer 49 are at or near the exterior 64 of the mixture layer 49. This assures, in the following step 108, that when a solvent is applied, that an adequate amount of particles are dissolved to provide the superhydrophobic qualities desired.

In step 108, upon curing of the mixture layer 49 and/or smoothing of the mixture layer 49 or sometime thereafter, the roughness-inducing particles 26 near the exterior 64 are dissolved or etched to form rough textural surfaces or superhydrophobic surfaces 66. Rough textural surfaces do not necessarily refer to surfaces that are rough when touched by hand, but are rather rough at the microscopic level, such that they perform as superhydrophobic surfaces. The mixture layer 49 and/or the component may be dipped into a bath of solvent 68, as shown within the etching station 20. The etching station 20 may include an overhead conveyor dipping system 69, which may be considered as an applicator, and used to dip component 46 and other components into the bath 68. Of course, other applicators may be used. The applicator may include a brush, a tank, a bath, a material rolling device, a molding device, or other application device known in the art. The solvent 68 may be sprayed on, brushed on, rolled on, or applied using some other application technique known in the art. The solvent 68 may be in the form of water, an alcohol, an acid, or other solvent depending upon the hydrophobic material and roughness-inducing particles utilized.

In step 110, any excess solvent or remaining residue is removed from the component and superhydrophobic surface in the finishing station 22. After dissolving the roughness-inducing particles the superhydrophobic surface may be rinsed with deionized water and then dried for a predetermined amount of time. In one embodiment of the present invention, the superhydrophobic surface is dried via filtered compressed air for approximately one hour and then air dried for approximately an additional hour. The superhydrophobic surface may be baked to remove any traces of the solvent.

Figure 5A:
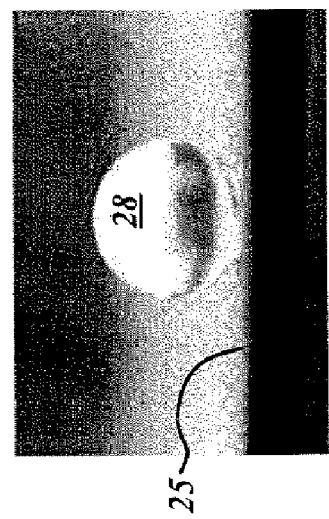
FIG. 5A is a pictorial view of water drops on a superhydrophobic material formed from etching of the modified hydrophobic material of FIG. 4A.
Figure 5B:
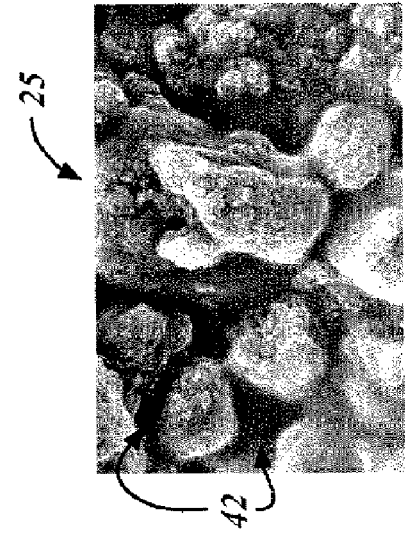
FIG. 5B is a pictorial and scanning electron microscopic view of the superhydrophobic material of FIG. 5A.

In FIGS. 5A and 5B, a pictorial view of water drops 70 on the superhydrophobic material or surface 66 and a pictorial and scanning electron microscopic view of the superhydrophobic surface 66 are shown. The texture of the superhydrophobic surface 66 is rougher that the texture of the hydrophobic material layer 25 and thus the hydrophobicity is increased such that water-shedding capability is increased. Water drops bead up on the superhydrophobic surface 66 such that they have nearly spherical shapes thereon.

Figure 6A:
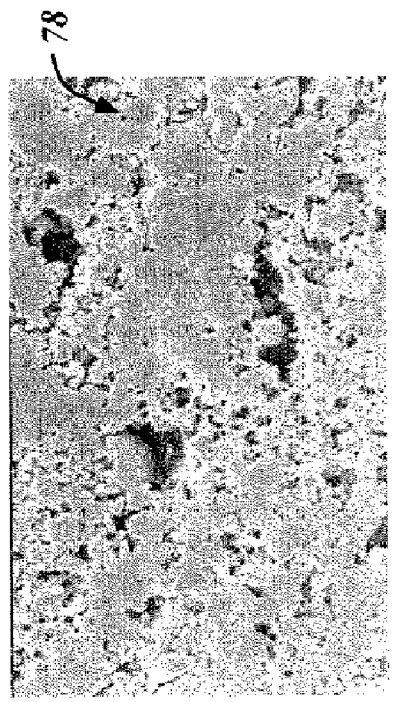
FIG. 6A is a pictorial view of water drops on a non-superhydrophobic surface formed by smoothing of the superhydrophobic material of FIG. 5A.
Figure 6B:
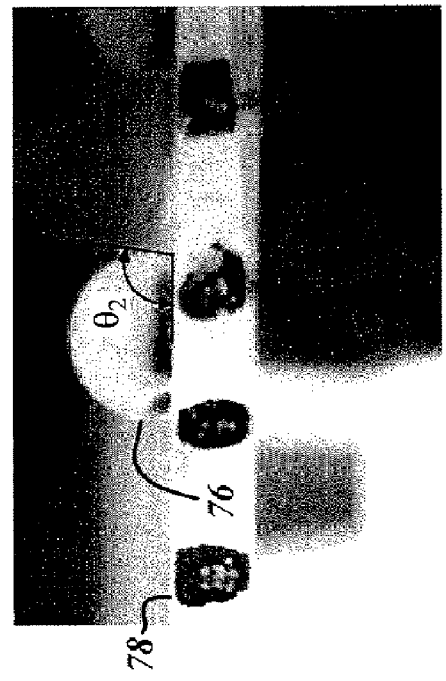
FIG. 6B is a pictorial and scanning electron microscopic view of the non-superhydrophobic surface of FIG. 6A.

In step 112, the superhydrophobic surface 66 is smoothed to form a non-superhydrophobic surface 70. The superhydrophobic surface 66 may, for example, be smoothed over time due to the use of the component 46 and wear and tear of the surface 66. The superhydrophobic surface 66 may be smoothed over a short time frame due to abrasive wear or use of the component 46 or may be smoothed due to other circumstances associated or related with the component 46. In FIGS. 6A and 6B, a pictorial view of a water drop 76 on the non-superhydrophobic surface 78 formed by the smoothing of the superhydrophobic material 66 and a pictorial and scanning electron microscopic view of the non-superhydrophobic surface 78 are shown. The water drop 76 does not bead up as much on the non-superhydrophobic surface 78 due to the smoothing of the surface and thus the increased surface tension thereof.

In step 114, the non-superhydrophobic surface 78 may be further smoothed or sanded beyond what naturally occurs or is induced in step 112 via an abrasive, similar to the smoothing process described in step 106. The surface 78 is smoothed such that a sufficient amount of the roughness-inducing particles 26 are exposed or near an exterior side 74 of the surface 78.

Figure 7A:
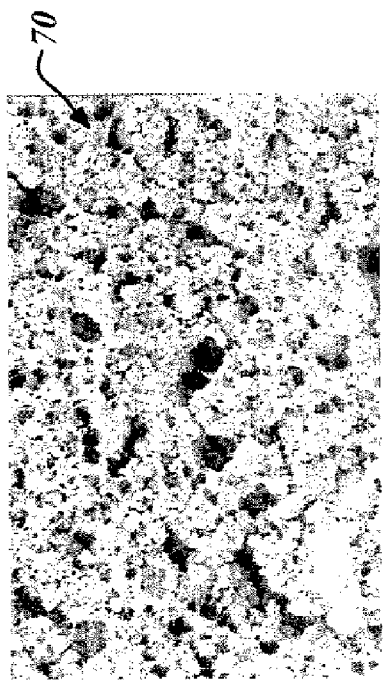
FIG. 7A is a pictorial view of water drops on a superhydrophobic surface formed from the non-superhydrophobic surface of FIG. 6A.
Figure 7B:
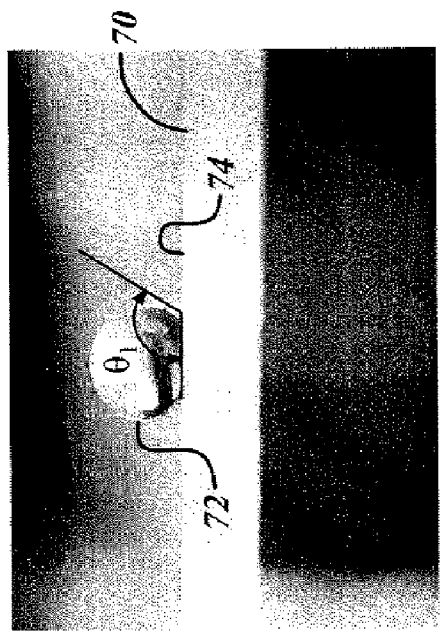
FIG. 7B is a pictorial and scanning electron microscopic view of the superhydrophobic surface of FIG. 7A.

In step 116, a second portion of the roughness-inducing particles 26 are dissolved, similar to the dissolving process described in step 108 to renew or restore the superhydrophobicity characteristics of the material layer 25. In FIGS. 7A and 7B, a pictorial view of a water drop 72 on the restored superhydrophobic surface 70 formed from the non-superhydrophobic surface 78 and a pictorial and scanning electron microscopic view of the superhydrophobic surface 70 are shown. Notice that the water contact angle $\theta_1$ for the superhydrophobic surface 70 is greater than the contact angle $\theta_2$ for the non-superhydrophobic surface 78, as shown in FIGS. 6A and 7A. Notice that the water droplet 72 beads up on the restored superhydrophobic surface 70 similarly as on the initially formed superhydrophobic surface 66 of FIGS. 5A and 5B. Steps 110-116 may be repeated as desired to restore the superhydrophobicity of the material.

The above-described steps are meant to be illustrative examples; the steps may be performed sequentially, synchronously, simultaneously, or in a different order depending upon the application. Of course, portions of the system described and the steps performed may be achieved manually or without the use of specialized equipment or machines. For example, the applying of a solvent to a surface may be performed through the brushing "by hand" of the solvent onto the surface of concern. As another example, in order to etch a surface of a component, the component may be dipped into a bath by hand.

The present invention provides a cost effective and efficient system and method for the formation of superhydrophobic material surfaces and the renewal thereof. The present invention increases service life of various components through the quick and easy restoration thereof to have the original water-shedding and contamination minimizing properties originally designed.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of forming a renewable superhydrophobic material comprising:
   mixing a hydrophobic material with a first plurality of soluble particles to form a mixture;
   curing said mixture;
   smoothing said mixture via an abrasive;
   etching away at least a first portion of said first plurality of soluble particles from said mixture to form the superhydrophobic material;
   as a surface of the superhydrophobic material wears away in use, exposing a second portion of soluble particles, regenerating said superhydrophobic material by smoothing a section of said superhydrophobic material to form a non-superhydrophobic surface; and
   etching away at least a second portion of said first plurality of soluble particles to convert said non-superhydrophobic surface into a superhydrophobic surface.

2. A method as in claim 1 wherein said hydrophobic material is a superhydrophobic material.

3. A method as in claim 1 wherein said first plurality of soluble particles comprises roughness-inducing particles.

4. A method as in claim 1 wherein said first plurality of soluble particles remain in solid form in said mixture.

5. A method as in claim 1 wherein said first plurality of soluble particles comprise at least one particle selected from: Calcium Carbonate ($CaCO_3$), and Sodium Chloride (NaCl).

6. A method as in claim 1 wherein etching away said first portion comprises applying a solvent to the superhydrophobic material.

7. A method as in claim 6 wherein said solvent is a substance selected from at least one of: water, alcohol, and acid.

8. A method as in claim 6 wherein applying a solvent comprises dipping said mixture in a bath.

9. A method as in claim 1 further comprising mixing a second plurality of particles with said hydrophobic material and said first plurality of soluble particles to form said mixture.

10. A method as in claim 9 wherein said second plurality of particles comprise photocatalytic oxidative effective particles.

11. A method as in claim 10 wherein said photocatalytic oxidative effective particles comprise titanium oxide ($TiO_2$).

12. A method as in claim 1 wherein said mixture forms at least one material selected from: a paint, a plastic, a film, a self supporting film, and a polymer.

13. A method as in claim 1 wherein etching away at least a second portion of said first plurality of soluble particles comprises applying a solvent to the non-superhydrophobic surface.

14. A method as in claim 1 further comprising smoothing said non-superhydrophobic surface via an abrasive prior to etching away said second portion.

15. A method as in claim 1 further comprising applying said mixture to a component.

16. A method as in claim 1 further comprising removing excess solvent and residue from the superhydrophobic material.

17. A renewable superhydrophobic material forming system comprising:
   a mixer for mixing a hydrophobic binder with a first plurality of soluble particles to form a mixture;
   a curing station for curing said mixture;
   a smoothing station for smoothing said mixture;
   an applicator for applying a solvent to said mixture to etch away at least a first portion of said first plurality of soluble particles from said mixture to form the superhydrophobic material;
   a second smoothing station for smoothing said superhydrophobic station to form a second non-superhydrophobic surface; and
   a second applicator for applying solvent to said mixture for etching away at least a second portion of said first plurality of soluble particles from said mixture to convert said second non-superhydrophobic surface into a superhydrophobic surface.

18. A system as in claim 17 wherein said mixer is a high shear mixer.

19. A system as in claim 17 wherein said curing station comprises at least one of: a mold, an oven, and a vacuum chamber.

20. A system as in claim 17 wherein said applicator comprises at least one of: a brush, a tank, a bath, a material rolling device, and a molding device.

21. A method of forming a renewable superhydrophobic material comprising:
   mixing a hydrophobic binder with a first plurality of soluble particles to form a mixture, said first plurality of soluble particles comprising;
      roughness-inducing particles; and
      photocatalytic oxidative effective particles;
   curing said mixture;
   smoothing a section of said superhydrophobic material to form a first non-superhydrophobic surface;
   etching away at least a first portion of said first plurality of soluble particles from said mixture to form the superhydrophobic material;
   smoothing said section of said superhydrophobic material to form a second non-superhydrophobic surface; and
   etching away at least a second portion of said first plurality of soluble particles to convert said second non-superhydrophobic surface into a superhydrophobic surface.

22. A method as in claim 21 wherein etching away said first portion and said second portion comprises applying a solvent to the superhydrophobic material and said non-superhydrophobic surface.

* * * * *